March 4, 1924.
E. N. FALES
1,485,780
FOLDING CHASSIS FOR AIRCRAFT
Filed March 9, 1922
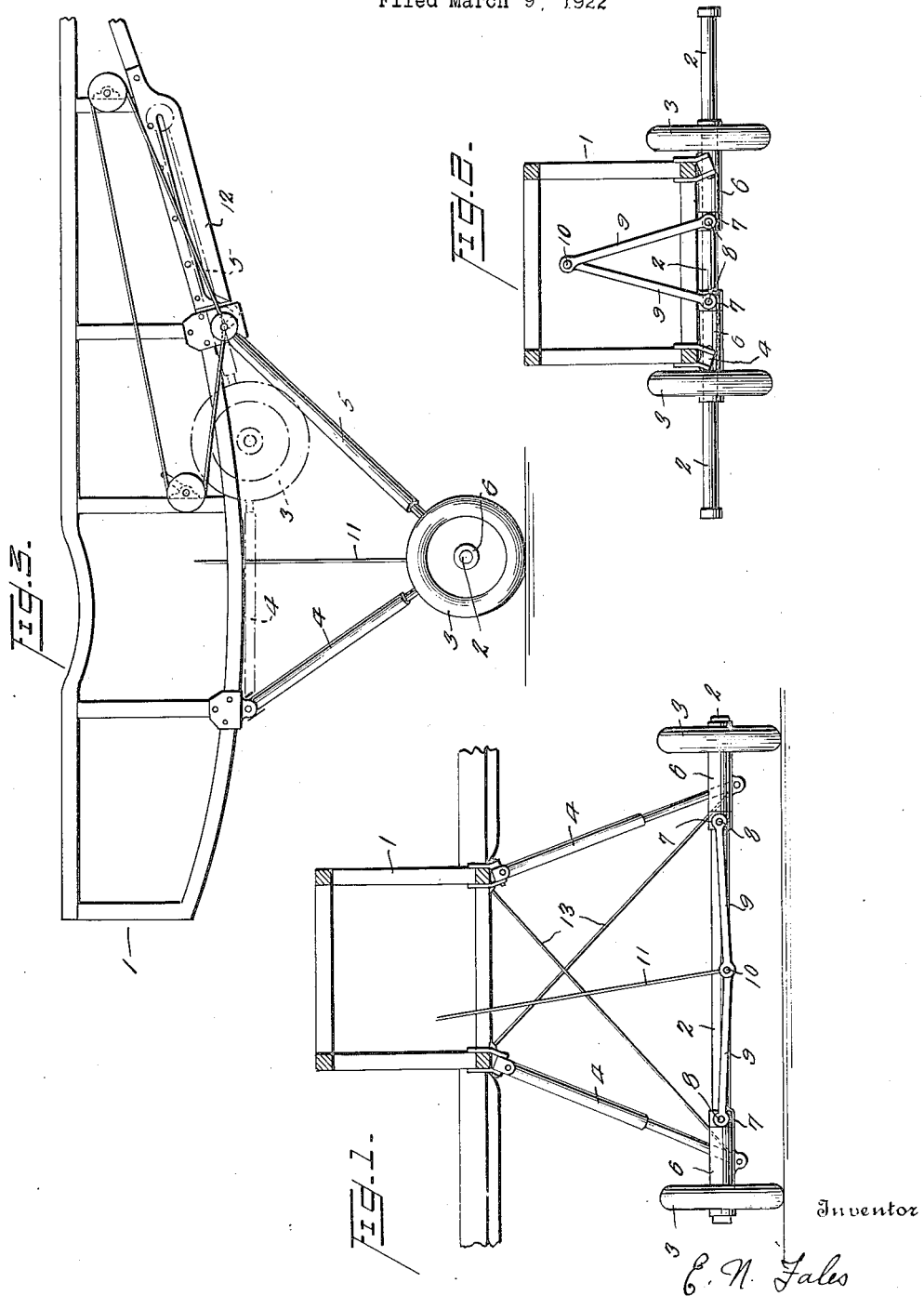
Inventor
E. N. Fales
By Robert H. Young  Attorney Patented Mar. 4, 1924.

1,485,780

UNITED STATES PATENT OFFICE.

ELISHA N. FALES, OF DAYTON, OHIO.

FOLDING CHASSIS FOR AIRCRAFT.

Application filed March 9, 1922. Serial No. 542,423.

*To all whom it may concern:*

Be it known that I, ELISHA N. FALES, a citizen of the United States, residing at Dayton, in the county of Montgomery and State of Ohio, have invented certain new and useful Improvements in Folding Chassis for Aircraft, of which the following is a specification.

This invention relates to folding chassis or landing gear for aircraft, the broad object in view being to materially reduce the head resistance of the craft by eliminating a greater portion of the head resistance of the landing gear or chassis when in flight.

Under the present invention it is proposed to slide the wheels of the chassis toward each other upon the shaft which connects the same and fold the remainder of the chassis upwardly against the bottom of the fuselage, the wheels, when the chassis is fully folded, lying close to and on opposite sides of the fuselage where they will afford a minimum amount of head resistance. The invention also involves means for raising and lowering the chassis and for sliding the wheels outwardly to their useful position on the axle and maintaining them in such position when landing or taking off. Means are employed whereby the outward thrust on the wheels is relieved whenever necessary, thereby permitting the same to move inwardly to their final folded positions.

With the above and other objects in view, the invention consists in the novel construction, combination and arrangement herein described, illustrated and claimed.

In the accompanying drawings—

Figure 1 is a front elevation of a sufficient portion of an airplane to illustrate the improved landing gear in its applied relation thereto;

Figure 2 is a similar view showing the folded position of the landing gear or chassis; and Figure 3 is a side elevation of the same.

The landing gear contemplated in this invention is designed for use in conjunction with and for application to the fuselage 1 of an airplane, such embodiment of the invention being illustrated in the drawings.

The landing gear or chassis comprises an axle 2 upon which are mounted wheels 3, the axle being braced in relation to the fuselage 1 and the latter being supported in relation to the axle 2 and the wheels 3 by means of main supporting legs 4, in addition to which I employ rearwardly extending and upwardly inclining struts or braces 5. The wheels 3 are journaled on sleeves 6 which are slidable longitudinally of the axle 2 for the purpose of moving the wheels inwardly from the position shown in Fig. 1 to the position illustrated in Fig. 2 in order that said wheels may occupy positions close to or in contact with the opposite sides of the fuselage, while the axle occupies a position directly under or in contact with the bottom of the fuselage. The legs 4 and the struts or braces 5 are suitably connected together and attached to the sleeves 6 preferably by shock absorbing means so that the landing and rolling shocks of the machine will be absorbed.

Arranged at the inner sides of the sleeves 6 are slidable thrust collars 7 which are movable longitudinally of the axle 2 and which, in their outer positions, normally sustain wheels 3 and prevent said sleeves and the wheels 3 from moving inwardly. The thrust collars 7 have connected thereto by pivots 8 toggle links or members 9 which are centrally connected together by a pivot 10. Extending upwardly from the pivot 10 is a toggle link operating connection or member 11, the latter extending into the fuselage so that it may be reached and operated by the aviator for breaking the joint between the toggle members 9 in order to move the thrust collars 7 inwardly and permit the wheels 3 to move in a corresponding direction so that they may occupy the final folded position illustrated in Fig. 2.

The braces or struts 5 have their upper ends slidably connected to suitable guides 12 extending under the bottom longerons of the fuselage and any suitable means, such as shown in the copending application, may be employed for sliding the upper rear extremities of the braces 5 in a fore and aft direction for folding the chassis or moving the parts thereof to their useful supporting positions.

In addition to the legs 4 and braces or struts 5, suitable diagonal truss members 13 are employed, the same being shown as connected at their upper extremities to the fuselage and attached at their lower extremities, either to the sleeves 6 or the lower portions of the legs 4. When the parts are in the position shown in Fig. 1 the tension members 13 are taut and perform their bracing functions, whereas as soon as the folding operation is started said tensioning members, which are usually wires or cables, are slacked, thereby permitting the easy folding movement of the chassis frame or members.

What I claim is:

1. In aircraft, the combination of a fuselage, and a folding chassis embodying an axle, wheels slidable thereon, legs having pivotal connection with the fuselage and also having connection with said wheels, and means permitting the wheels to slide inwardly toward the center of the axle as the chassis is folded.

2. In aircraft, the combination of a fuselage, and a folding chassis embodying an axle, wheels slidable thereon, legs having pivotal connection with the fuselage and also having connection with said wheels, and means permitting the wheels to slide inwardly toward the center of the axle as the chassis is folded, and serving also to sustain the wheels in their operative position.

3. In aircraft, the combination of a fuselage, and a folding chassis embodying an axle, wheels slidable thereon, legs having pivotal connection with the fuselage and also having connection with said wheels, and toggle means permitting the wheels to slide inwardly toward the center of the axle as the chassis is folded.

4. In aircraft, the combination of a fuselage, and a folding chassis embodying an axle, movable upwardly against the fuselage, wheels slidable on said axle, and foldable legs for supporting the fuselage in relation to the axle, the wheels being adapted to slide inwardly on the axle as the latter is moved against the fuselage.

5. In aircraft, the combination of a fuselage, and a folding chassis embodying an axle, movable upwardly against the fuselage, wheels slidable on said axle, and foldable legs for supporting the fuselage in relation to the axle, the wheels being adapted to slide inwardly on the axle as the latter is moved against the fuselage, and means for thrusting said wheels outwardly toward the ends of the axle when the axle is lowered.

6. In aircraft, the combination of a fuselage, and a folding chassis embodying an axle, movable upwardly against the fuselage, sleeves slidable on said axle, wheels carried by said sleeves, legs between said sleeves and the fuselage, slidable thrust collars on the axle movable toward the center of the axle to permit the sleeves and wheels to move in a corresponding direction, said collars serving to thrust the sleeves and wheels in the opposite direction, and means for sliding and holding said collars.

In testimony whereof I affix my signature.

ELISHA N. FALES.